United States Patent [19]

Bryant

[11] 4,176,012
[45] Nov. 27, 1979

[54] ADJACENT LOOP DISTILLATION

[76] Inventor: Jeffrey J. Bryant, 6727 Woodland, Shawnee, Kans. 66218

[21] Appl. No.: 868,440

[22] Filed: Jan. 10, 1978

[51] Int. Cl.$^2$ .............................................. C02B 1/06
[52] U.S. Cl. ................................... 202/172; 202/180; 202/182; 202/185 A; 203/11; 203/22; 203/25
[58] Field of Search ............ 203/10, 11, 40, DIG. 17, 203/22, 25; 202/235, 180, 177, 185 A, 182, 173, 174, 158, 197, 172, 205

[56] References Cited

U.S. PATENT DOCUMENTS

| | | | |
|---|---|---|---|
| 3,096,255 | 7/1963 | Redenbaugh | 203/11 |
| 3,172,922 | 3/1965 | Kehse | 202/158 |
| 3,367,845 | 2/1968 | Coit et al. | 202/173 |
| 3,398,059 | 8/1968 | Cane et al. | 202/173 |
| 3,446,712 | 5/1969 | Othmer | 202/173 |
| 3,457,143 | 7/1969 | Kunst | 202/173 |
| 3,649,471 | 3/1972 | Kunst | 202/173 |
| 3,791,934 | 2/1974 | Webb | 202/173 |

Primary Examiner—Wilbur L. Bascomb, Jr.
Attorney, Agent, or Firm—D. A. N. Chase

[57] ABSTRACT

An impure liquid is continuously distilled in a deaerated conduit arranged in a coil to present adjacent loops in heat exchange relationship. The conduit is divided by a partial partition into a distilland trough and a distillate trough, the latter being on the outside of each loop. The impure liqid is introduced into the distilland trough for flow therealong and vaporization, and the resultant vapor crosses over to the distillate trough due to centrifugal force and condensation within the distillate trough. As the vapor condenses in the distillate trough, the heat of condensation is transferred to the distilland trough of the adjacent downstream loop and to the incoming liquid flowing in a feed tube lying in the distillate trough. Spaced obstructions to vapor flow in the distillate trough and flow guide fins are employed to increase efficiency. A number of coi

19 Claims, 6 Drawing Figures

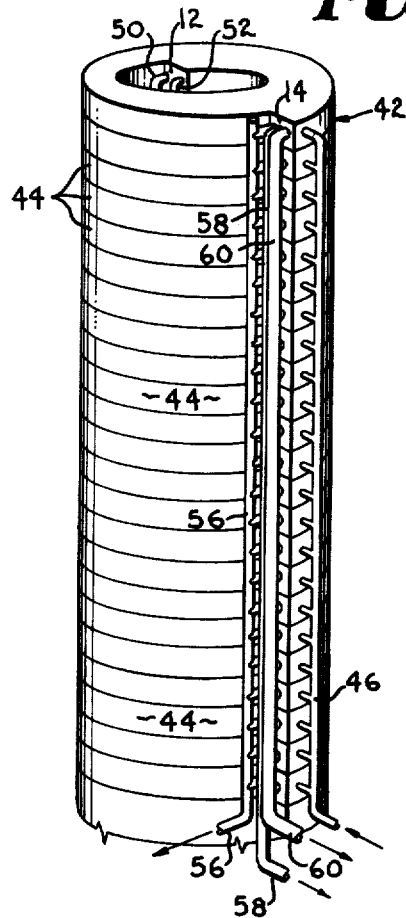
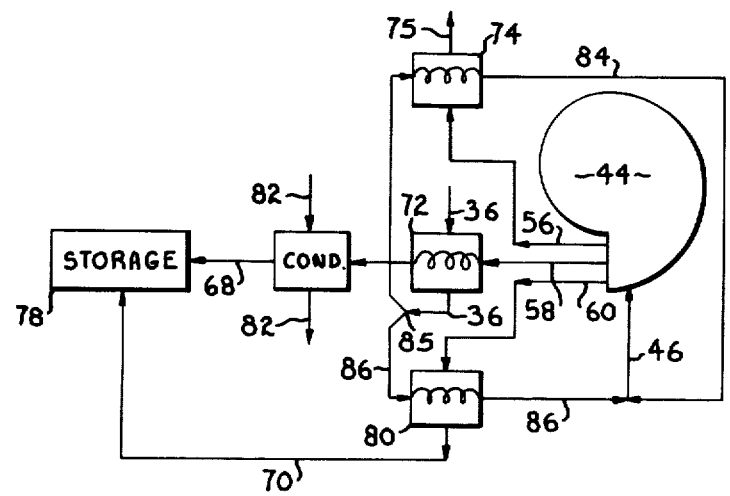
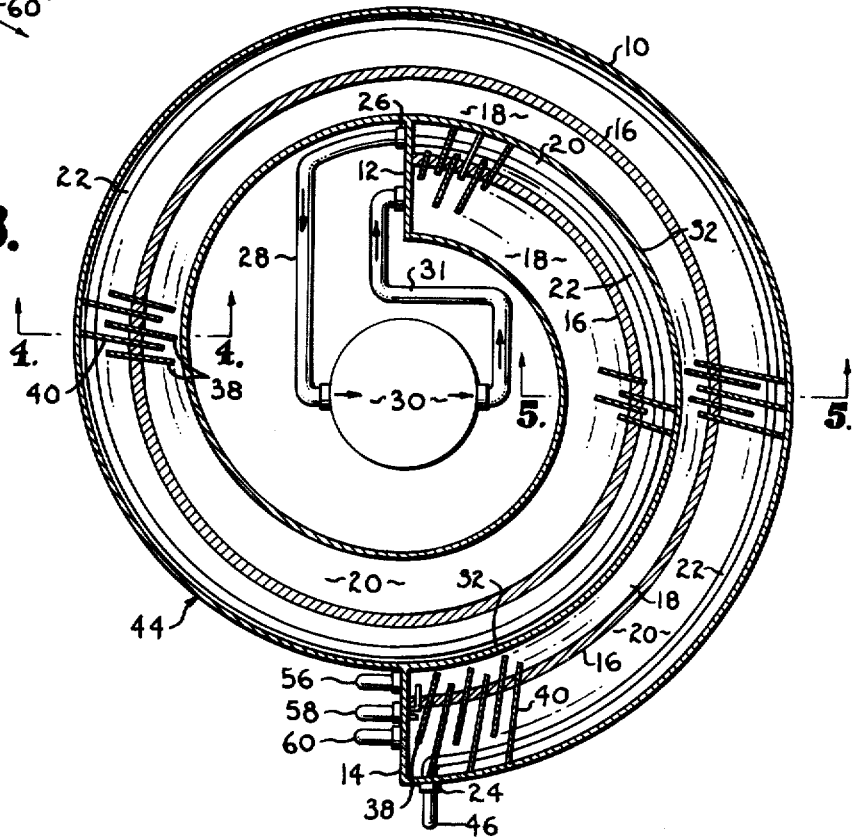

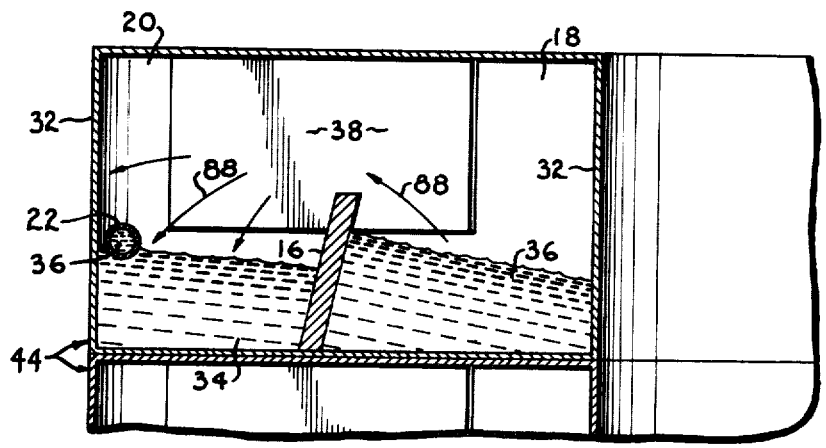
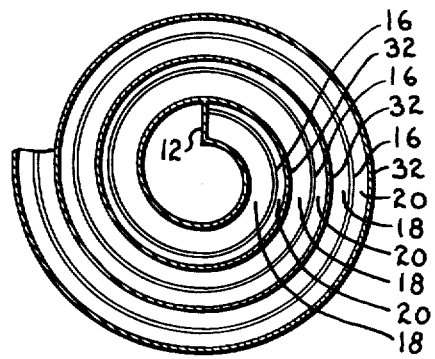
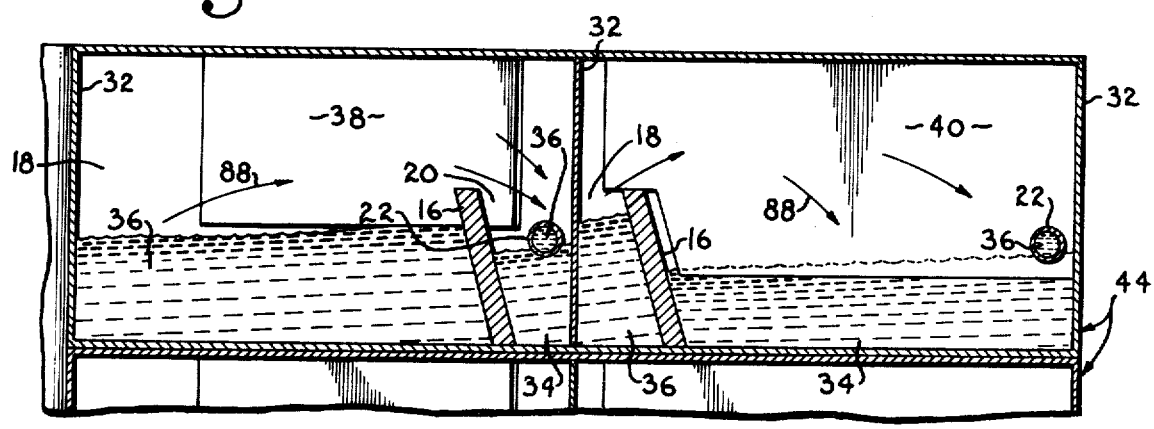

ADJACENT LOOP DISTILLATION

This invention relates to improvements in apparatus for the desalination of salt water and, additionally, to an apparatus which subjects a distilland to vaporization under a continuous and gradual drop in pressure and temperature.

A continuing search for inexpensive apparatus for the desalination of sea water is fueled by the proximity of oceans to arid desert land badly in need of irrigation. At the present time, multistage flash distillation (MSF) and variations thereof as described in Row, R. C., and Othmer, D. F., *Mechanical Engineering*, May 1971, p. 27, and the references cited therein are the most widely used desalination processes known to the inventor.

The MSF process utilizes a series of chambers wherein each chamber has a lower temperature and pressure than the preceding one. The impure water or sea water evaporates in increments as it travels from chamber to chamber. Each chamber must have sufficient temperature differential between the flashing water and the condensate to insure a reasonably rapid distillation. This temperature differential, therefore, limits the number of chambers that can be employed. Furthermore, the MSF process and variations thereof require close control and employ complicated apparatus.

It is, therefore, an important object of the present invention to provide an apparatus for the distillation of an impure liquid that overcomes the problems and disadvantages discussed above.

More specifically, it is an important object of this invention to provide apparatus as aforesaid that efficiently and continuously induces vaporization of the impure liquid and condensation thereof rather than by employing discrete chamber steps.

Another important object of this invention is to provide apparatus as aforesaid wherein the heat given off when the impure liquid vapor condenses is transferred back to the yet unvaporized impure liquid, thus promoting additional vaporization.

Still another important object of this invention is to provide apparatus as aforesaid which is shaped in the form of a coil wherein the impure liquid and vapor arising therefrom are caused to rotate about the coil to separate the vapor from the distilland by the action of centrifugal force.

Still another important object of this invention is to provide apparatus as aforesaid where the coil consists of a conduit having two troughs, the inner trough (distilland trough) carrying the impure liquid, and wherein due to centrifugal force and the cooler wall of the outer trough the vapor arising from the impure liquid collects in the outer trough (distillate trough).

Still another important object of this invention is to provide apparatus as aforesaid wherein the vapor flow in the distillate trough is impeded and, therefore, the surface pressure in the distilland trough is decreased since the vapor flow is relatively faster; thus vaporization is aided.

Still another important object of this invention is to provide apparatus as aforesaid that is of simple construction and relatively inexpensive to erect.

Yet another important object of this invention is to provide distillation apparatus as aforesaid wherein a number of coil units employing the present invention can be stacked in alignment one on top of another, for increased efficiency and capacity.

Furthermore, it is an important object of this invention to provide distillation apparatus as aforesaid that reduces energy costs by conserving heat and reducing the loss thereof.

DESCRIPTION OF THE DRAWINGS

FIG. 1 is a perspective view of a number of coil units employing the present invention shown in an aligned, stacked relationship, the coil units being shortened for illustration and clarity;

FIG. 2 is a flow diagram showing products from the distilland and distillate troughs after the adjacent loop distillation process is completed;

FIG. 3 is a horizontal cross-section through one of the shortened coil units of FIG. 1, the boiler and connections thereto being schematically illustrated;

FIG. 4 is an enlarged, fragmentary, cross-sectional view taken along line 4—4 of FIG. 3 with fins and obstructions partially visible in the background not shown for clarity;

FIG. 5 is on the same scale as FIG. 4 and is an enlarged cross-sectional view taken along line 5—5 of FIG. 3; and FIG. 6 is a fragmentary, diagrammatic top view illustrating that the distillate trough of an upstream loop shares a common heat conductive wall with the distilland trough of the adjacent downstream loop.

DETAILED DESCRIPTION

A conduit 10 of rectangular cross-sectional configuration is illustrated in FIGS. 3–5 and diagrammatically illustrated in FIG. 6. As shown therein, the conduit 10 is arranged in a coil 44 and thereby presents a plurality of adjacent, generally circular loops. The coiled conduit 10 has a center end wall 12 defining the inlet end thereof, and an outer end wall 14 presenting the outlet end of the conduit 10.

A partial partition 16 extends the length of the conduit 10 and divides the same into a distilland trough 18 and a distillate trough 20 located at the inside and the outside respectively of each loop of the coil. Near the inlet end 12 of the conduit 10, the distillate trough 20 is smaller in width than the distilland trough 18. The distillate trough 20 progressively increases in size relative to the distilland trough 18 from the inlet end 12 to the outlet end 14 of the conduit 10, where at outlet end 14 the distillate trough 20 is greater in width than the distilland trough 18. In FIG. 3, for example, it may be seen that the relative proportions of the two troughs reverse in size over the one and one-half loop, shortened coil there illustrated.

A feed tube 22 lies in the distillate trough 20 and has its input end 24 at the outlet end 14 of conduit 10. The feed tube 22 presents an output end 26 at the center, inlet end wall 12 of conduit 10. A connecting tube 28 communicates with output end 26 to form a continuous feed line that extends through end wall 12 and leads to a heat source or boiler 30 schematically illustrated in FIG. 3. An outlet line 31 extends from the boiler 30 through end wall 12 for the purpose of discharging the distilland into the trough 18.

In FIG. 6 the diagrammatic view illustrates a fragmentary portion of a coil, two and three-fourths loops being shown. A heat conducting wall 32 presents a common wall between adjacent upstream and downstream loops, i.e., the radially outer wall of the distillate trough 20 of an upstream loop is also the radially inner wall of the distilland trough 18 of an adjacent downstream loop. Flow of the distilland and distillate is clockwise from the center inlet end 12. The partial partition 16 dividing the conduit 10 into the distilland trough 18 and distillate trough 20 is a heat insulator.

An impure liquid such as sea water is introduced into the input end 24 of feed tube 22 for flow therethrough in a direction counter to the direction of flow of the distilland and distillate in their respective troughs. Prior to introduction, the impure liquid is deaerated as is conventional in large-scale distillation processes. The impure liquid flows through the feed tube 22 to output end 26 thereof and then through connecting tube 28 to the boiler 30 where the temperature thereof is elevated for introduction into the distilland trough 18. It should also be understood that the conduit 10 is deaerated by a vacuum pump (not shown) before the liquid is introduced. The temperature of sea water at introduction into the inlet end 12 is selected in accordance with the vapor pressure desired, and could range from 70° C. to 400° C. with the preferred temperatures being from 150° C. to 250° C.

A number of flow guide fins 38 are spaced along the conduit 10 and extend transversely thereof at less than a right angle to the direction of flow of the distilland and distillate, the fins 38 being inclined somewhat in such direction of flow as is evident in FIG. 3. The fins 38 are rectangular (FIGS. 4 and 5) and are mounted on the partial partition 16. The fin 38 seen in FIG. 4 (where the two troughs are approximately equal in size) extends longitudinally above the liquid levels from midway in the distilland trough 18 across a substantial portion of the distillate trough 20. A number of obstructions 40 are likewise spaced along the conduit 10 and alternate with the fins 38. As is clear in FIG. 5, each of the obstructions 40 is in the form of a rectangular plate having a notched lower corner permitting the same to be mounted on the partition 16. The obstructions 40 are disposed in the distillate trough 20 and extend completely thereacross and down into the distillate 34 in order to impede flow. In FIGS. 4 and 5 the distilland is shown at 36 and the levels in the two troughs may be compared.

In practice, the coil 44 of the present invention could contain from 20 to 60 adjacent loops. It is suggested that each trough in the middle loops of the coil (where the troughs 18 and 20 would be of approximately the same width) be from 6 to 24 inches wide (15 to 62 cm.). The conduit 10 including the common, heat-conductive wall 32 may be constructed from a suitable metal such as stainless steel or aluminum. The preferably non-conductive partial partition 16 can be selected from such materials as fiberglass-reinforced plastics, hollow glass and ceramics.

In FIG. 1 a multi-unit distillation system 42 comprising a plurality of coils 44 of the type shown in FIGS. 3–6 are stacked one on top of another. The ceilings of each of the coils 44 is the floor of the coil above it. The troughs of the respective stacked coils 44 are in alignment as is illustrated fragmentarily in FIGS. 4 and 5 so that the common ceiling-floor of each coil 44 assures temperature equality among the vertically adjoining distalland troughs, and likewise among the vertically adjoining distillate troughs. To prevent heat loss, the bottom and the top of the stack of coils 44 is covered with a layer of insulating material (not shown). Furthermore, the outer surface of each coil 44 should also be provided with a heat insulating covering which, for example, could be an insulating jacket or layers of insulating material.

The manner in which the stacked coils 44 are employed in an integrated distillation system may be appreciated from a comparison of FIGS. 1 and 3. For simplicity of illustration and ease of understanding, the view of FIG. 3 shows only a very simplified, one and one-half loop coil 44 and its connections to the schematically illustrated boiler 30. In a multi-unit system as in FIG. 1, the boiler 30 serves all of the coils 44 and the latter are provided with manifold structures to operate all coils 44 in unison.

Referring to FIG. 1, the impure liquid is introduced into the coils 44 by a feed line 46 which communicates with each of the input ends 24 of the feed tubes 22 within the respective coils 44. The upper ends of a boiler inlet manifold 50 and a boiler outlet manifold 52 are visible in FIG. 1, and it is to these manifolds that the connecting tube 28 and outlet line 31 of boiler 30 are respectively connected. A distilland return line 56 communicates with the outlet ends 14 of the distilland troughs 18 of the coils 44 and collects the unvaporized distilland. The produces of the distillation process are removed from the coil stack by lines 58 and 60. As is illustrated in FIG. 3, the line 58 communicates with the outlet end 14 of both troughs 18 and 20 of each coil 44 above the level of any liquid therein so as to draw off uncondensed vapor that may remain. The line 60 communicates exclusively with the outlet ends of the distillate troughs 20 of the coils 44 at the base of each of such troughs to drain the distillate from the stack.

The flow diagram of FIG. 2 illustrates an energy recovery mechanism that may be employed in the present invention to minimize heat loss and maximize recovery of the distillate product. A heat exchanger 72 receives the vapor from line 58 and such vapor is passed in heat exchange relationship with fresh impure liquid illustrated by the arrows designated 36 in FIG. 2. A heat exchanger 74 receives the unvaporized distilland from line 56 and the fresh impure liquid flowing along a branch line 84, which has now been elevated in temperature by the action of heat exchanger 72. The heat exchanger 74 is interposed in line 84 to raise the temperature of the fresh liquid an additional increment before introduction into each of the coils 44 via line 46. In like manner, a portion of the heated fresh liquid from heat exchanger 72 flows along a branch line 86 from tee 85 to a heat exchanger 80 which also receives the distillate from line 60. The heat exchanger 80 is interposed in line 86 to further preheat the impure liquid as it passes in heat exchange relationship with the distillate previously recovered by the distillation apparatus.

A final condenser 76 downstream from heat exchanger 72 is employed to condense any remaining vapor from line 58, which is then discharged to storage 78 along line 68. Lines 82 communicating with condenser 76 represent the flow of cold water (fresh sea water, for example) through the condenser structure. The recovered distillate is also piped to storage 78 via a line 70 from heat exchange 80. If desired, the impure liquid appearing at outlet 75 of heat exchangr 74 may be recycled and returned to the feed line 46.

OPERATION

As discussed above the impure liquid 36 initially introduced in the distilland trough 18 at the center inlet end 12 of conduit 10 is deaerated and at an elevated selected temperature. Due to the deaeration and the temperature of the impure liquid, a vapor arises from the impure liquid upon entry into the distilland trough 18. The impure liquid then flows along the conduit 10 in the distilland trough 18 and is accompanied by the vapor arising therefrom.

The impure liquid flowing through the loops of the coil 44 is subject to centrifugal force. The partial partition 16 is high enough to prevent the impure liquid 36 from lapping over even though the circular flow of the liquid 36 will cause the level of the liquid to slant upward toward the outside of the curve (see FIGS. 4 and 5). However, the vapor arising from the impure liquid 36 crosses over the partition 16 into the distillate trough 20.

In FIGS. 4 and 5 the vapor-directing ability of fins 38 is shown. Vapor as demonstrated by arrows 88 arises from the impure liquid 36 in the distilland trough 18, comes in contact with the fin 38 and is guided thereby into the distillate trough 20. Due to centrifugal force, the vapor inherently collects in the distillate trough, but the fins aid and enhance this action.

The obstructions 40 as shown in FIG. 5 impede vapor flow in the distillate trough 20 as the vapor in the distillate trough flows along the conduit 10. The effect of the obstructions is to give the vapor more time to condense in the relatively high temperature regions of the upstream loops of the conduit 10. This is desirable since the heat of condensation will be transferred via the common wall 32 from the distillate trough to the impure liquid in the adjacent downstream distilland trough. Therefore, the heat released by condensation in the early loops is transferred to impure liquid in downstream loops to cause additional vaporization, and the process is continually repeated as the flow progresses radially outwardly from the center of the coil 44.

As is most readily apparent in FIG. 3, the vapor flow in the distilland trough 18 is relatively unimpeded as compared to the vapor flow in the distillate trough 20 due to the presence of the obstructions 40 in the distillate trough 20. Therefore, the vapor flow in the distillate trough is relatively lower as compared to the distilland trough. Accordingly, due to the bernoulli effect, since the vapor is moving more rapidly in the distilland trough, the surface pressure of the impure liquid 36 is decreased to thereby promote increased vaporization of the impure liquid in the distilland trough 18.

The vapor as it rised from the distilland trough 18 and crosses over to the distillate trough 20 due to centrifugal force condenses as distillate 34 in the distillate trough on the feed tube 22 and on the wall 32. Accordingly, some of the heat of condensation is absorbed by the impure liquid 36 in the feed tube 22. Furthermore, as the vapor condenses on the common wall 32, the heat of the condensation associated therewith is absorbed by the impure liquid in the distilland trough 18 of the adjacent downstream loop, thereby promoting increased vaporization in that loop as well.

Alternatively, in the present invention the impure liquid can be introduced at the outer end of the coil rather than the center inner end. In such system the distilland trough at the outer end would be large and the distillate trough small, and the distilland trough would constantly but gradually decrease in size relative to the distillate trough as the troughs progress to the center outlet end.

It should be understood that vapor and liquid in a vacuum will move from high pressure regions to low pressure regions. In conduit 10, the high pressure regions are the initial loops where the temperature is the highest and the low pressure regions are the outer downstream loops where the temperature is lowest. The downstream loops are lower in temperature since the feed tube 22 laid in the distillate trough 20 contains an impure liquid 36 that is yet to be heated, and such liquid cools the distillate 34 in the distillate trough 20 as it flows in tube 22 from input end 24. Moreover, despite insulation, some of the heat of condensation from the outer downstream loops will escape to the surrounding air. Also, the energy recovery mechanisms as illustrated in FIG. 2 reduce the temperature of the distillate 34 and the unvaporized, impure liquid in line 56 and condense and cool the vapor from line 58. Additionally, the condensing of the vapor by the final condenser 76 causes a suction effect in the conduit 10 and the vapor therein will, therefore, flow downstream toward the outlet end 14.

Having thus described the invention, what is claimed as new and desired to be secured by Letters Patent is:

1. Distillation apparatus comprising:
   a substantially deaerated conduit having an inlet end and an outlet end with one of said ends being an inner end and the other an outer end, said conduit arranged in a generally spiral-like configuration about said inner end to present a plurality of generally laterally adjacent loops of said conduit extending continuously from said inner end to said outer end, each pair of adjacent loops presenting therein an upstream loop and downstream loop relative to said inlet end;
   a partial partition in said conduit extending from said inlet to said outlet end and dividing the conduit into an inside distilland trough and an outside distillate trough for carrying an impure liquid to be distilled and the distillate derived therefrom, respectively; and
   means communicating with said inlet end for delivering the impure liquid to the distilland trough at a selected temperature and pressure and for flow of said impure liquid and vapor arising therefrom along said distilland trough toward said outlet end and accompanying flow of said vapor under centrifugal force across said partition to said distillate trough, whereby said vapor will tend to collect in said distillate trough and condense therein,
   each pair of adjacent, upstream and downstream loops of said conduit having a common, heat-conducting wall between the distillate trough of the upstream loop and the distilland trough of the adjacent downstream loop,
   said common wall of each pair of adjacent loops transferring heat to the downstream distilland trough given off as the evaporating liquid condenses in the distillate trough of the upstream loop, whereby the impure liquid is continuously vaporized and condensed.

2. The apparatus as claimed in claim 1, wherein each partition is a heat insulator.

3. The apparatus as claimed in claim 1, wherein said communicating means includes a feed tube in said distillate trough for delivering said impure liquid from a source to said inlet end, whereby the vapor tends to condense on both said tube and said common wall.

4. The apparatus as claimed in claim 1, wherein said conduit has an outer surface provided with a heat-insulating covering thereon.

5. A multi-unit distillation system comprising a plurality of distillation apparatuses as claimed in claim 1, the respective conduits thereof being stacked one on top of another with corresponding distilland and distillate troughs of the conduits in vertical alignment, there being a common ceiling-floor between each pair of adjoining conduits.

6. The system as claimed in claim 5, wherein said stack of conduits has a top and a bottom of heat-insulating material.

7. The apparatus as claimed in claim 1, wherein said distillate trough increases in size relative to said distilland trough from said inlet end to said outlet end.

8. The apparatus as claimed in claim 1, further comprising a plurality of flow guides spaced along said conduit for directing said vapor from said distilland trough to said distillate trough.

9. The apparatus as claimed in claim 1, further comprising means in said conduit for impeding vapor flow in said distillate trough, to decrease the surface pressure of the impure liquid due to the more rapid vapor movement in the distilland trough to thereby promote increased vaporization of the impure liquid in the distilland trough.

10. Distillation apparatus comprising:
a substantially deaerated conduit having an inlet end and an outlet end and arranged in a coil provided with generally laterally adjacent loops thereof extending continuously from said inlet end to said outlet end;
a partial partition in said conduit extending from said inlet to said outlet end and dividing the conduit into an inside distilland trough and an outside distillate trough for carrying an impure liquid to be distilled and the distillate derived therefrom, respectively;
means communicating with said inlet end for delivering the impure liquid to the distilland trough at a selected temperature and pressure and for flow of said impure liquid and vapor arising therefrom along said distilland trough toward said outlet end and accompanying flow of said vapor under centrifugal force across said partition to said distillate trough, whereby said vapor will tend to collect in said distillate trough and condense therein; and
means in said conduit for impeding vapor flow in said distillate trough, to decrease the surface pressure of the impure liquid due to the more rapid vapor movement in the distilland trough to thereby promote increased vaporization of the impure liquid in the distilland trough.

11. The apparatus as claimed in claim 10, wherein said impeding means includes a plurality of obstructions in said distillate trough spaced therealong, whereby said vapor has more time to condense in relatively high temperature regions of the conduit.

12. The apparatus as claimed in claim 10, further comprising a plurality of flow guides spaced along said conduit for directing said vapor from said distilland trough to said distillate trough.

13. The apparatus as claimed in claim 12, wherein each of said guides comprises a fin extending transversely of said troughs across said partition.

14. The apparatus as claimed in claim 10, wherein said communicating means includes a feed tube in said distillate trough for delivering said impure liquid from a source to said inlet end, whereby the vapor tends to condense on both said tube and said common wall.

15. The apparatus as claimed in claim 10, wherein said conduit has an outer surface provided with a heat-insulating covering thereon.

16. A multi-unit distillation system comprising a plurality of distillation apparatuses as claimed in claim 10, the respective coils thereof being stacked one on top of another with corresponding distilland and distillate troughs of the coils in vertical alignment, there being a common ceiling-floor between each pair of adjoining coils.

17. The system as claimed in claim 16, wherein said stack of coils has a top and a bottom of heat-insulating material.

18. The apparatus as claimed in claim 10, wherein said distillate trough increases in size relative to said distilland trough from said inlet end to said outlet end.

19. The apparatus as claimed in claim 1, wherein said adjacent loops are horizontally aligned whereby the inlet and outlet ends are positioned at the same elevation.

* * * * *